Figure 1:
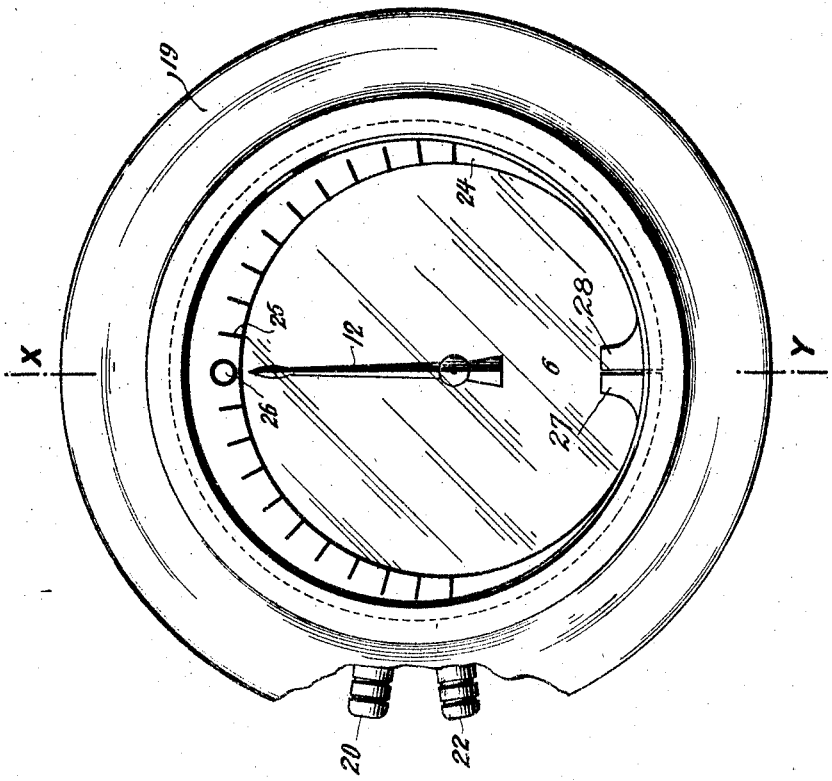

G. BREWER.
PRESSURE GAGE.
APPLICATION FILED OCT. 31, 1918.

1,330,513.

Patented Feb. 10, 1920.
2 SHEETS—SHEET 1.

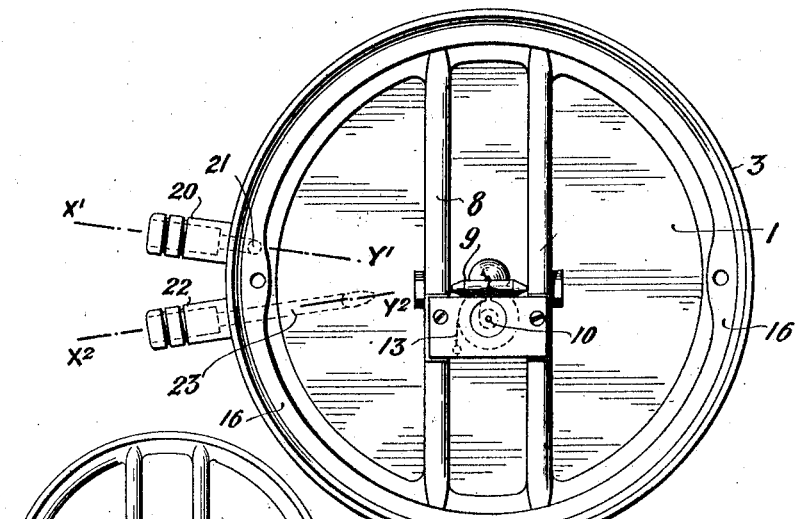
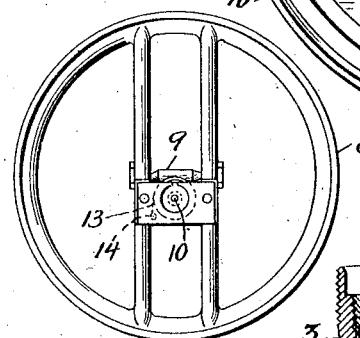
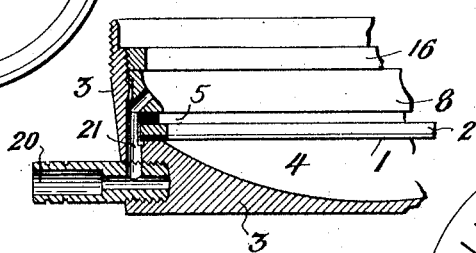
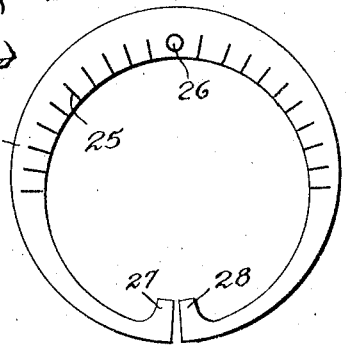
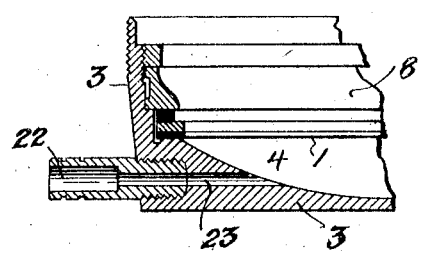

UNITED STATES PATENT OFFICE.

GRIFFITH BREWER, OF LONDON, ENGLAND.

PRESSURE-GAGE.

1,330,513. Specification of Letters Patent. Patented Feb. 10, 1920.

Application filed October 31, 1918. Serial No. 260,569.

*To all whom it may concern:*

Be it known that I, GRIFFITH BREWER, a subject of the King of Great Britain, residing at London, England, have invented certain new and useful Improvements in Pressure-Gages, of which the following is a specification.

This invention refers to an improved pressure gage of a type similar to the anemometer described in the United States Patent No. 1146202 dated the 13th July 1915 granted to Alec Ogilvie.

Now the object of the present invention is to provide certain improvements as hereafter claimed and described, whereby a pressure gage is produced, capable of indicating very small or minute differences in pressure between two pressures received through two tubes, especially for indicating differences between air pressures, and the instrument according to this invention is particularly applicable for use on aircraft.

According to this invention, in order to communicate the movements of the elastic diaphragm to the pivoted indicating finger, the movements of said diaphragm being due to very small or minute differences in pressures conveyed to the compartments on opposite sides of the diaphragm, the flexible connection is affixed to the geometric center of the elastic diaphragm and passes over a revoluble roller to change the direction of the flexible connection, the roller being so situated that the flexible connection extends from the diaphragm to the roller at right angles to the surface of the diaphragm. The flexible connection subsequently passes around and is fixed to the eccentrically located spindle of the indicating finger, which spindle is at right angles to the surface of the diaphragm: the attachment of the flexible connection to the diaphragm being located at the geometric center thereof, and the spindle of the indicating finger being somewhat eccentric to the diaphragm, consequently the dial on which the finger indicates is concentric to the finger and eccentric to the diaphragm.

Since the office of the instrument is to indicate small differences between two pressures, the indicating finger would, when the pressures are equal in the two compartments, be in a zero position and would indicate in a clockwise or counterclockwise direction through a portion of a circle upon the divisions of the dial according to variations between the two pressures. By connecting the flexible connection to the geometric center of the diaphragm, greater accuracy of indication is obtained.

The dial is made capable of angular adjustment so that it can be set to accord with the zero position of the hand when at rest, all as hereafter described.

The invention will be understood by reference to the accompanying drawings which show a typical example of construction.

Figure 2:
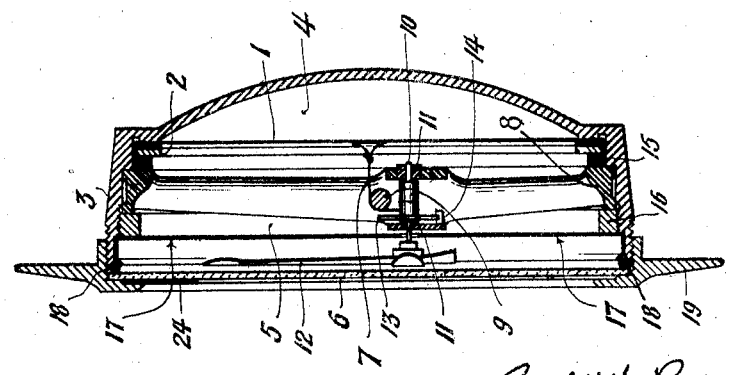

Figure 1 is a front elevation of a pressure gage constructed according to this invention, Fig. 2 is a vertical cross section of the same taken on the line X—Y of Fig. 1, Fig. 3 is a front elevation of the instrument with certain parts removed, Fig. 4 is a view showing the bridge frame removed from the instrument, and Fig. 5 is a like view of an annular dial removed from the instrument. Figs. 6 and 7 are sectional views taken respectively on the lines $X^1$—$Y^1$ and $X^2$—$Y^2$ of Fig. 3, showing the two tubes through which the pressures are delivered to opposite sides of the diaphragm.

Referring to the drawings, an elastic diaphragm 1, say of india rubber, at the requisite tension is fixed to and carried by a ring 2 fitted into a case the interior of which is preferably circular, said diaphragm 1 being located so as to divide the case 3 into two compartments 4 and 5; the front end or face of said case being closed in an airtight manner by a transparent plate 6 which may be of glass.

According to this invention a flexible connection 7 is affixed by any suitable means to the geometric center of the elastic diaphragm 1, the said flexible connection being contained in the compartment 5 which is closed by the transparent plate 6.

Located in the compartment 5 is a bridge frame 8 shown separately at Fig. 4, said frame being constructed with bearings to carry a revoluble roller 9 the axis of which is parallel with the surface of the diaphragm and the periphery of which roller, over which the flexible connection 7 passes, is so located that said connection extends from the diaphragm 1 to the roller 9 at right angles to the surface of the diaphragm 1.

The bridge frame 8 is further constructed with bearings 11 to carry a revoluble spindle 10 at right angles to the surface of the diaphragm 1 and eccentric relatively to the center of said diaphragm, and the flexible connection 7 passes from the roller 9 around the spindle 10, and has its end fixed thereto. An indicating finger 12 is fixed to the spindle 10 adjacent to the inner face of the transparent plate 6.

A spiral or hair spring 13 is provided, having one end fixed at 14 to the bridge frame 8 and its opposite end fixed to the spindle 10 and serving to give the indicating finger 12 a tendency to return and remain in one definite angular position.

In the construction shown in the drawings and particularly at Fig. 2, it will be observed that the diaphragm 1 is fixed by adhesive to a diaphragm ring 2 and is supported against an annular seat on the case 3, an indiarubber ring 15 is dropped upon the diaphragm ring 2, the bridge frame 8 is then placed in position and retained by a locking ring 16 screwthreaded into the case 3, a cover plate 17 is inserted, and an indiarubber ring 18 is inserted upon which the transparent closure plate 6 bears to form an airtight joint, the plate 6 being retained in position by a flanged locking ring 19 screwthreaded on the exterior of the case, so that the compartments 4 and 5 are hermetically closed.

Referring to Figs. 3, 6 and 7, a tube 20 is fitted into the case 3 and communicates by a passage 21 with the compartment 5, see Fig. 6, while a second tube 22, Fig. 7, is fitted into the case and communicates by a passage 23 with the compartment 4, and it is through these two tubes that the two differing pressures are permitted to communicate with the respective compartments 4 and 5.

From the above detailed description of the example of construction illustrated it will have been observed that the axis of the indicating finger 12 is eccentric with reference to the exposed portion of the transparent plate 6, and therefore the dial or radial graduations upon which the finger 12 indicates is eccentric to the case and concentric with the axis of the finger. Where the maximum or greater pressure acts at one time on one side of the diaphragm 1 and at another time acts on the other side of the diaphragm 1, the dial of the instrument should be fitted so that the zero mark thereon is adjustable, and it is convenient generally to make the dial adjustable so that its radial graduations can be adjusted by movement of the dial to cause the finger to point to zero when at rest. As shown here, by gripping the inward projections, 27, 28, of the dial and pressing the same toward each other, the dial can be adjusted relatively to the case, and the zero mark 26 can be set opposite to the indicating finger when the latter is at rest.

In the construction shown the external periphery of the dial plate 24, Fig. 5, is concentric with the case 3, when *in situ*, Figs. 1 and 2 and the central aperture of the dial plate 24 is eccentric to its periphery. The dial plate 24 has its outer edge accommodated in a recess or rabbet of the locking rings 19, Fig. 2, and consequently is held in face contact with the transparent plate 6, the radial graduations 25, Figs. 1 and 5, being of course concentric with the axis of the indicating finger 12 and eccentric to the periphery of the dial plate 24 and to the case, and the dial plate can be accordingly adjusted angularly as required so as to bring the zero mark 26, Fig. 5, into such a position that the finger 12 will indicate zero when at rest as shown at Fig. 1.

The dial plate shown at Fig. 5 is of less width at its lower part than at its upper part, and it is divided at its narrower lower part, a small space existing between the divided ends, so that when the divided ends are brought together, or nearly so, the diameter of the annular dial is lessened and it can be easily adjusted angularly in the locking ring 19, and when the divided ends are released the dial plate automatically expands and is locked in position, the particular construction however of the expansible and adjustable dial plate illustrated at Fig. 5 forming the subject of the United States patent application Serial No. 260,570 filed Oct. 31, 1918 by myself.

What I claim as my invention and desire to secure by Letters Patent is:—

1. In a pressure gage for indicating small differences between two pressures particularly air pressures; the combination with a cylindrical case closed at one end and a transparent plate to close the opposite end thereof, an elastic diaphragm dividing the interior of said case into two closed compartments, and two tubes entering said case one communicating with each compartment to convey pressures thereinto; of a spindle rotatably mounted within said case eccentrically of the geometric center of said diaphragm and at right angles thereto, an indicating finger on said spindle located beneath said transparent plate, a positive connection between the geometric center of said elastic diaphragm and said eccentrically located spindle to communicate angular movement to said finger in accordance with the movement of said diaphragm, and a dial plate having radial graduations upon which said finger indicates, said radial graduations being concentric with said spindle of said finger.

2. In a pressure gage for indicating small differences between two pressures particularly air pressures; the combination with a cylindrical case closed at one end and a transparent plate to close the opposite end thereof, an elastic diaphragm dividing the interior of said case into two closed compartments, and two tubes entering said case one communicating with each compartment to convey pressure thereinto; of a flexible connection having one end thereof fixed to the geometric center of the elastic diaphragm and extending at right angles therefrom in said compartment having said transparent closure plate, a revoluble spindle located eccentrically of the geometric center of said elastic diaphragm and at right angles thereto, bearings to carry said spindle, an indicating finger fixed on said spindle within said compartment and beneath said transparent plate, means for guiding said flexible connection to allow of the opposite end of said flexible connection extending around said spindle and having its end fixed thereto, and a dial plate having radial graduations upon which said finger indicates, said radial graduations being concentric with said spindle of said finger.

3. In a pressure gage for indicating small differences between two pressures particularly air pressures; the combination with a cylindrical case closed at one end and a transparent plate to close the opposite end thereof, an elastic diaphragm dividing the interior of said case into two closed compartments, and two tubes entering said case one communicating with each compartment to convey pressures thereinto; of a spindle rotatably mounted within said case eccentrically of the geometric center of said diaphragm and at right angles thereto, an indicating finger on said spindle located beneath said transparent plate, a positive connection between the geometric center of said elastic diaphragm and said eccentrically located spindle to communicate angular movements to said finger in accordance with the movements of said diaphragm, a dial plate having radial graduations upon which said finger indicates, said radial graduations being concentric with said spindle of said finger, and means for angularly adjusting said dial to set same to accord with the zero position of said finger when at rest.

4. In a pressure gage for indicating small differences between two pressures particularly air pressures; the combination with a cylindrical case closed at one end and a transparent plate to close the opposite end thereof, an elastic diaphragm dividing the interior of said case into two closed compartments, and two tubes entering said case one communicating with each compartment to convey pressure thereinto; of a flexible connection having one end thereof fixed to the geometric center of the elastic diaphragm and extending at right angles therefrom in said compartment having said transparent closure plate, a revoluble spindle located eccentrically of the geometric center of said elastic diaphragm and at right angles thereto, an indicating finger fixed on said spindle within said compartment and beneath said transparent plate, a revoluble roller located adjacent to said spindle with its axis at right angles thereto and parallel with said diaphragm to support said flexible connection and change its direction to allow of the opposite end of said flexible connection extending around said spindle and having its end fixed thereto to communicate angular movements to said finger in accordance with movements received by said diaphragm, bearings in said case to support said spindle and said roller, and a dial plate having radial graduations upon which said finger indicates, said radial graduations being concentric with said spindle of said finger.

5. In a pressure gage for indicating small differences between two pressures particularly air pressures; the combination with a cylindrical case closed at one end and a transparent plate to close the opposite end thereof, an elastic diaphragm dividing the interior of said case into two closed compartments, and two tubes entering said case one communicating with each compartment to convey pressures thereinto; of a spindle rotatably mounted within said case eccentrically of the geometric center of said diaphragm and at right angles thereto, an indicating finger on said spindle located beneath said transparent plate, a positive connection between the geometric center of said elastic diaphragm and said eccentrically located spindle to communicate angular movements to said finger in accordance with the movements of said diaphragm, an annular dial plate having its inner periphery concentric with the axis of said spindle and its outer periphery concentric with the geometric center of said diaphragm and said cylindrical case, the face of said dial having graduations marked thereon adjacent to the inner periphery of said dial plate, said dial plate being located upon the exterior surface of said transparent plate, and means for retaining said dial plate in position on said transparent plate so as to be capable of angular adjustment relatively to said finger when in a position of rest.

In witness whereof I have hereunto set my hand in the presence of two witnesses.

GRIFFITH BREWER.

Witnesses:
THOMAS W. ROGERS,
WILLIAM A. MARSHALL.